US012611677B2

(12) United States Patent
Kemi et al.

(10) Patent No.: US 12,611,677 B2
(45) Date of Patent: Apr. 28, 2026

(54) BEARING ARRANGEMENT OF A HORIZONTAL GRINDING MILL AND METHOD FOR DETERMINING THE FILL RATE OF THE MILL

(71) Applicant: AKTIEBOLAGET SKF, Gothenburg (SE)

(72) Inventors: Eric Sixten Jonas Kemi, Sigtuna (SE); Stijn Van Eesbeek, Doorn (NL); Mohamad Amin Al Hajj, Utrecht (NL); Hans Linus Lejon Efraimsson, Askim (SE)

(73) Assignee: AKTIEBOLAGET SKF, Gothenburg (SE)

( * ) Notice: Subject to any disclaimer, the term of this patent is extended or adjusted under 35 U.S.C. 154(b) by 393 days.

(21) Appl. No.: 18/487,273

(22) Filed: Oct. 16, 2023

(65) Prior Publication Data

US 2024/0139754 A1 May 2, 2024

(30) Foreign Application Priority Data

Oct. 26, 2022 (DE) ......................... 102022211338.1

(51) Int. Cl.
*B02C 17/18* (2006.01)

(52) U.S. Cl.
CPC ........ *B02C 17/1805* (2013.01); *B02C 17/181* (2013.01)

(58) Field of Classification Search
CPC .......................... B02C 17/1805; B02C 17/181
See application file for complete search history.

(56) References Cited

U.S. PATENT DOCUMENTS

| | | | | | |
|---|---|---|---|---|---|
| 4,561,599 | A * | 12/1985 | Shaver | B02C 25/00 | 241/34 |
| 7,694,904 | B2 * | 4/2010 | Thome | B02C 17/18 | 241/101.2 |
| 2013/0092777 | A1 * | 4/2013 | Belke | B02C 17/24 | 241/284 |

* cited by examiner

*Primary Examiner* — Matthew Katcoff
(74) *Attorney, Agent, or Firm* — J-TEK LAW PLLC; Scott T. Wakeman; Mark A. Ussai

(57) ABSTRACT

A bearing arrangement of a horizontal grinding mill with a drum includes a first bearing device and a second bearing device, the drum being supported in rotation by the first and second bearing devices. The bearing arrangement further includes a load determiner that determines a load applied on the first bearing device and fill rate determiner that determines a fill rate of the drum during normal operation of the horizontal grinding mill from a first relationship determined during a calibration period. The first relationship correlates the fill rate of the drum to the determined load applied on the first bearing device.

15 Claims, 3 Drawing Sheets

BEARING ARRANGEMENT OF A HORIZONTAL GRINDING MILL AND METHOD FOR DETERMINING THE FILL RATE OF THE MILL

CROSS-REFERENCE

This application claims priority to German patent application no. 102022211338.1 filed on Oct. 26, 2022, the contents of which are fully incorporated herein by reference.

BACKGROUND OF THE INVENTION

The present invention is directed to bearings, and more particularly to bearing arrangements for grinding mills and methods for determining fill rates of grindings mills.

Generally, to assess or determine the fill rate of a drum of a horizontal grinding mill, the power generated by a motor driving the drum is monitored as there is a general correlation between the power needed to rotate the drum and the weight of the drum. However, this correlation is not linear, and when the fill rate of the drum reaches higher or greater filling levels, the motor power decreases leaving the operator in a “blind spot” in which the operator does not know if the fill rate of the drum is actually decreasing or the amount of material within the drum is too great.

These methods for estimating of the fill rate of the drum are not sufficiently accurate, such that the drum is loaded within a safety margin in order to avoid an overfilling of the drum. An overfilling of a drum may result in an unplanned and undesired shut down of the grinding process, resulting in production losses.

Further, the fill rate of the drum has a direct influence on product quality, process efficiency and process control. As the environment inside the drum is typically harsh or corrosive, there is generally no practical capability of positioning a sensor within the drum in order to directly measure the fill rate of the drum. Additionally, as the drum is typically rotating, the use of wired sensors is generally difficult.

SUMMARY OF THE INVENTION

An object of the present invention is to provide a method and apparatus for accurately determining the fill rate of a drum of a horizontal grinding mill.

According to one aspect, a method for determining the fill rate of drum of a horizontal grinding mill, which includes a first bearing device and a second bearing device supporting the drum in rotation, is proposed. This method comprises:

determining a load applied on the first bearing device during normal operation of the horizontal grinding mill (i.e., during typical production operating conditions), and determining the fill rate of the drum during normal operation of the horizontal grinding mill from a first relationship determined during a training or calibration period, the first relationship linking or correlating the fill rate of the drum to the determined load applied on the first bearing device.

The method enables the accurate estimation of the fill rate of the drum in real time without analyzing the power generated by a motor driving the drum, allowing for a more accurate estimation of the fill rate inside the drum.

Preferably, the method further comprises determining a load applied on the second bearing device, the first relationship correlating the fill rate of the drum to the determined load applied on the first bearing device and to the determined load applied on the second bearing device.

Preferably, the method further comprises determining the first relationship during the training/calibration period, the determination of the first relationship comprising:

a) filling the drum with a material;
b) rotating the filled drum;
c) stopping the filled drum;
d) measuring the fill rate of the drum and the load applied on each bearing device;
e) repeating the steps a) to d) a plurality of times for different quantities of the material; and
f) after repeating the steps a) to d) a plurality of times, determining a first relationship between the measured fill rates of the drum and the measured loads applied on each bearing device.

Preferably, each bearing device comprises a bearing, which is provided with an inner ring and with an outer ring capable of rotating concentrically relative to one another, and a fiber optic sensor comprising an array of optical strain gauges mounted on the inner or outer ring of the bearing. Also preferably, the step of determining the load applied on each bearing device comprises:

measuring the deformations of the inner or outer ring of each bearing from the array of optical strain gauges; and determining the load acting on each bearing from the deformations of the inner or outer ring of the said bearing and a predetermined second relationship between the deformations and the load.

Preferably, the first relationship is a regression model.

According to another aspect, a bearing arrangement of a horizontal grinding mill, the grinding mill including a drum, is proposed. The bearing arrangement comprises a first bearing device and a second bearing device, the drum being supported in rotation by the first and second bearing devices.

The bearing arrangement of the horizontal grinding mill further comprises:

load determining means configured to determine a load applied on the first bearing device; and fill rate determining means configured to determine the fill rate of the drum during normal operation of the horizontal grinding mill from a first relationship determined during a training or calibration period, the first relationship linking or correlating the fill rate of the drum to the determined load applied on the first bearing device.

Preferably, the load determining means or “load determiner” are/is further configured to determine the load applied on the second bearing device, and the first relationship links the fill rate of the drum to the determined load applied on the first bearing device and to the determined load applied on the second bearing device. Once again, the first relationship is a preferably a regression model.

Preferably, each bearing device includes a bearing provided with an inner ring and with an outer ring capable of rotating concentrically relative to one another, and a fiber optic sensor comprising an array of optical strain gauges mounted on the inner or outer ring of the bearing, and the load determining means/load determiner comprise: measuring means, or a measuring device, configured to measure the deformations of the inner or outer ring of each bearing from the array of optical strain gauges, and second determining means, or a second load determiner, configured to determine the load acting on each bearing from the deformations of the inner or outer ring of each bearing and a predetermined second relationship between the deformations and the loads.

Preferably, the measuring means or measuring device comprise an optical interrogator connected to at least one fiber optic sensor.

BRIEF DESCRIPTION OF THE SEVERAL VIEWS OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
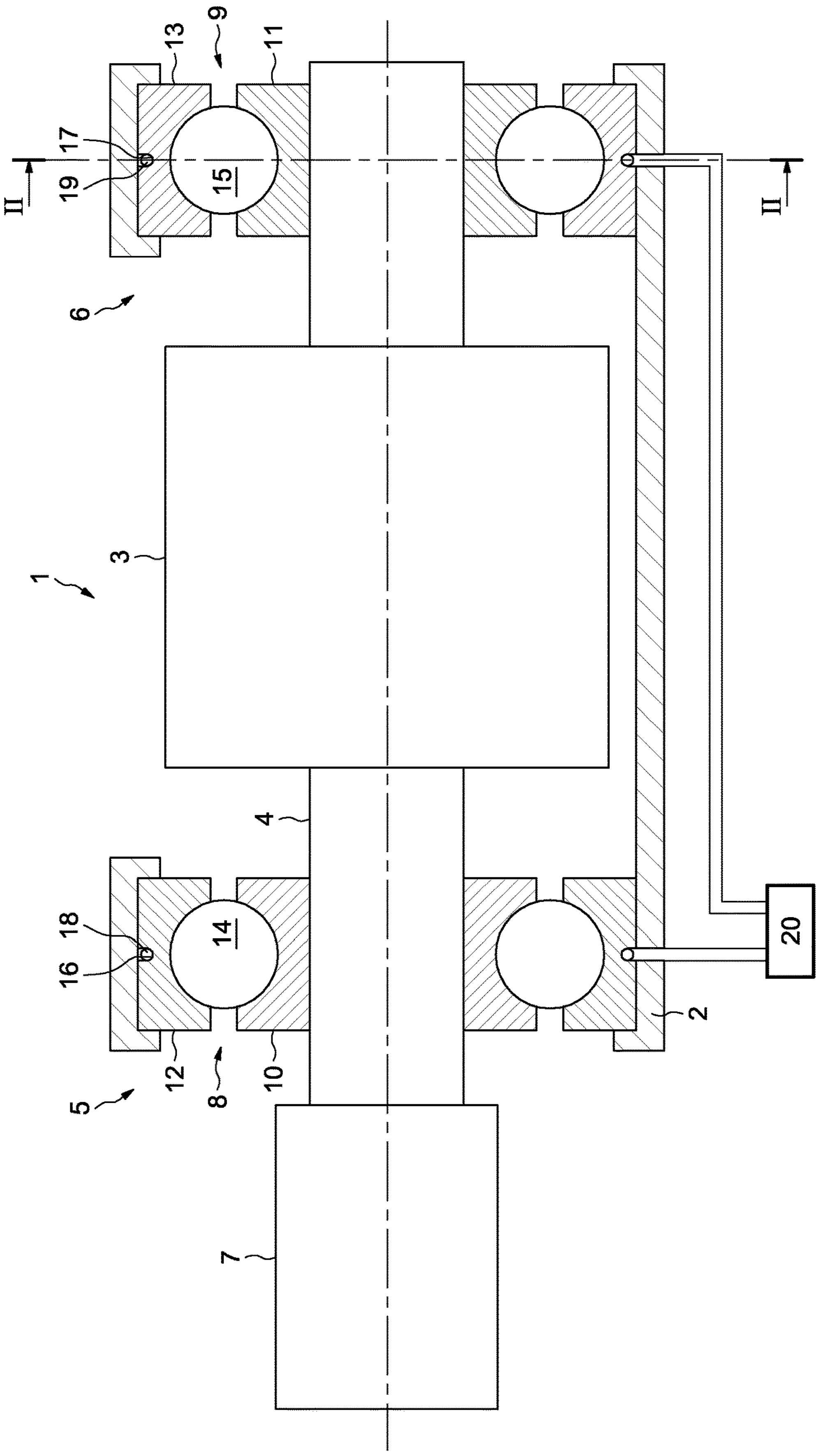
FIG. 1 illustrates schematically a partial longitudinal cross section of a horizontal grinding mill with a bearing arrangement according to the invention.

Reference is made to FIG. 1, which represents schematically a partial longitudinal cross section of a horizontal grinding mill 1. The horizontal grinding mill 1 comprises a housing 2 and a drum 3 including a shaft 4, which is supported in the housing 2 by a first bearing device 5 and a second bearing device 6. Thus, a bearing arrangement of the horizontal grinding mill 1 comprises the first bearing device 5 and the second bearing device 6. Further, a motor 7 drives the shaft 4 to rotate about a central axis (not indicated).

The first bearing device 5 and the second bearing device 6 may be identical or may be formed differently (e.g., one signal row and the other double row, one including balls and the other rollers, etc.). Each bearing device 5, 6 includes a roller bearing 8, 9 provided with an inner ring 10, 11 mounted on the shaft 4 and an outer ring 12, 13 mounted into the bore of the housing 2. Each outer ring 12, 13 radially surrounds the inner ring 10, 11. Either the inner rings 10, 11 and/or the outer rings 12, 13 rotate concentrically relative to each other.

Each roller bearing 8, 9 is further provided with a row of rolling elements 14, 15, respectively, radially interposed between inner and outer raceways of the inner rings 10, 11 and the outer rings 12, 13. In the illustrated example, the rolling elements 14, 15 are balls. Alternatively, the roller bearings 8, 9 may include any other appropriate types of rolling elements 14, 15, for example cylindrical rollers, tapered rollers, needles, etc. In the illustrated example, the roller bearings 8, 9 each include only a single row of rolling elements 14, 15. Alternatively, the roller bearing comprises several rows of rolling elements. Alternatively, the bearing 8, 9 may not include any rolling elements; in other words, the bearing 8, 9 may be plain bearings.

An annular groove 16, 17 is formed in the outer surface of each one of the outer rings 12, 13 of each roller bearing 8, 9. Each groove 16, 17 is oriented radially outwardly so as to radially face the bore of the housing 2.

An optical fiber 18, 19 is housed into or disposed within the groove 16, 17 of the outer ring 12, 13 of each roller bearing 8, 9. Each optical fiber 18, 19 is connected to a monitoring device 20. In the illustrated example, the optical fibers 18, 19 are mounted on the outer rings 12, 13 of the roller bearings 8, 9 as described above. However, the optical fibers 18, 19 may each alternatively be mounted on the inner rings 10, 11 of the roller bearings 8, 9 or one fiber 18 or 19 may be mounted in the outer ring 12, 13 and the other fiber 19, 18 may be mounted in the inner ring 11, 10.

Figure 2:
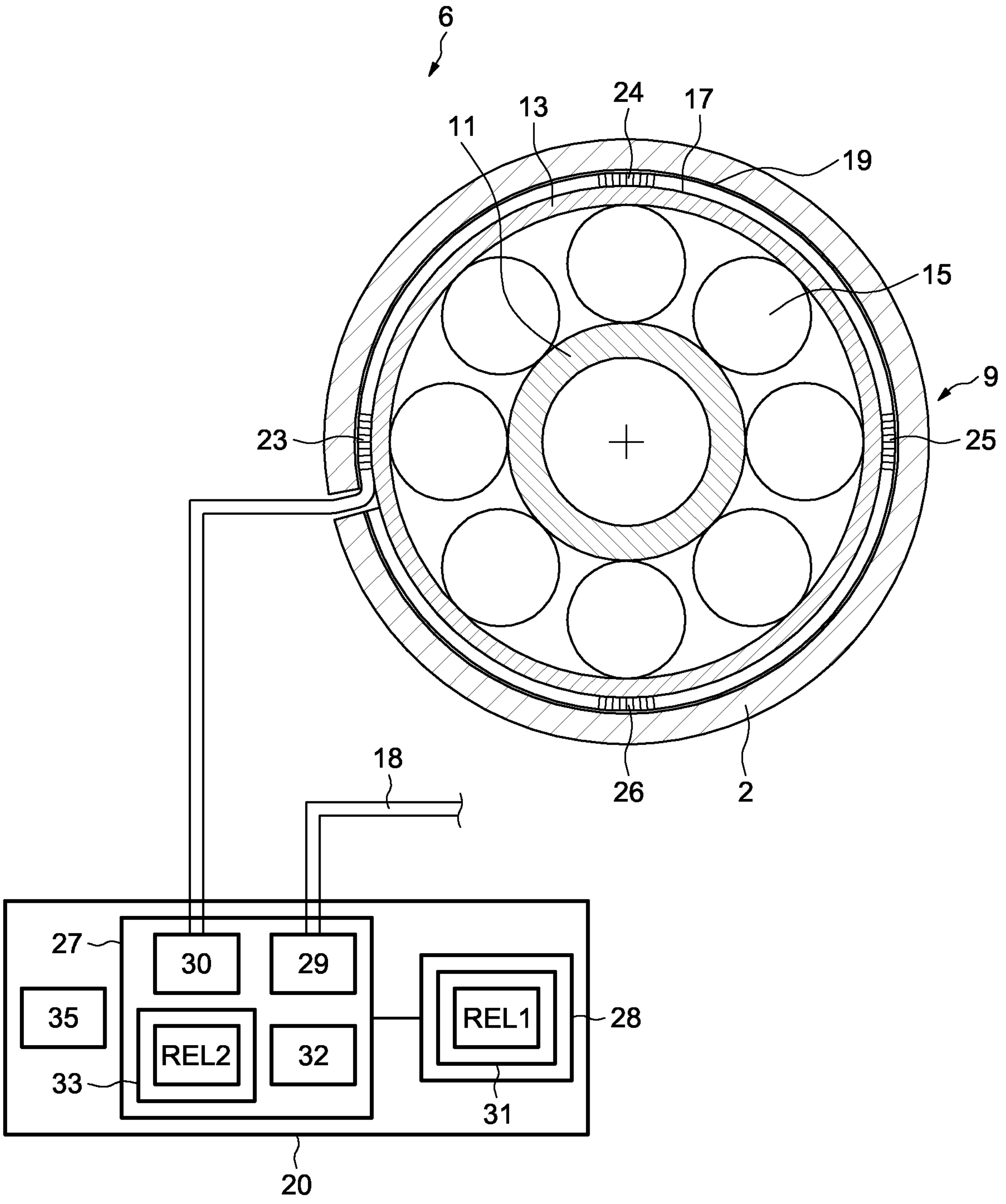
FIG. 2 illustrates schematically a monitoring device according to the invention.

As the first and second bearing devices 5, 6 are preferably identical, FIG. 2 only illustrates an example of the second bearing device 6, which includes the roller bearing 9, and the monitoring device 20.

The optical fiber 19 preferably comprises optical strain gauges 23, 24, 25, 26 mounted into the groove 17 of the outer ring 13. In the illustrated example, the optical fiber 19 comprises the four optical strain gauges 23, 24, 25, 26. In other variants, the optical fiber 19 may comprise less or more than four optical strain gauges.

Each optical strain gauge 23, 24, 25, 26 includes a different set of refraction gratings, for example a set of Bragg refraction gratings. When the optical strain gauges 23, 24, 25, 26 are illuminated by an optical signal, for example emitted by a laser, each set of refraction gratings reflects a part of the optical signal. Each reflected signal by the optical strain gauges 23, 24, 25, 26 has a different wavelength so that the reflected signal emitted by each optical strain gauges 23, 24, 25, 26 may be identified.

When a load is applied on the bearing 9, the optical fiber 19 is stretched or compressed so that the reflected wavelength changes. The optical fiber 18 of the first bearing device 5 comprises a first array of optical strain gauges (not depicted, but preferably identical to strain gauges 23, 24, 25, 26) and the optical fiber 19 of the second bearing device 6 comprises a second array of strain gauges comprising the optical strain gauges 23, 24, 25, 26.

The bearing arrangement of the horizontal grinding mill further comprises a monitoring device 20 which includes both load determining means 27, or a load determiner 27, and fill rate determining means 28, or a fill rate determiner 28. The fill rate determining means 28 are intended to determine the fill rate of the drum 3 and include a first memory 31 storing a first predetermined relationship REL1 between the fill rate of the drum 3, the load applied on the first bearing device 5, and the load applied on the second bearing device 6. The first predetermined relationship REL1 is determined during a training or calibration period outside of normal production operations of the grinding mill 1.

The load determining means/load determiner 27 are/is intended to determine the load applied on the first bearing device 5 and on the second bearing device 6. The load determining means 27 comprise measuring means or a measuring device provided with a first optical interrogator 29 connected to the optical fiber 18 of the first bearing device 5 in order to measure the deformations of the outer ring 12 of the roller bearing 8 by use of the optical strain gauges.

The measuring means/measuring device preferably further comprises a second optical interrogator 30 connected to the optical fiber 19 of the second bearing device 6 to measure the deformations of the outer ring 13 of the roller bearing 9 from the optical strain gauges 23, 24, 25, 26. Each one of the first and second optical interrogators 29, 30 includes an optical signal transmitter (not represented), for example a laser, and an optical receiver (not represented).

The load determining means 27 further comprise second determining means 32 and a second memory 33 storing a predetermined second relationship REL2 between the deformations measured by the interrogators 29, 30 and the loads on the bearings 5, 6. In one variant, the second memory 33 is located outside the load determining means 27.

The monitoring device 20 comprises a processing unit 35 implementing the load determining means 27 and the fill rate determining means 28.

Figure 3:
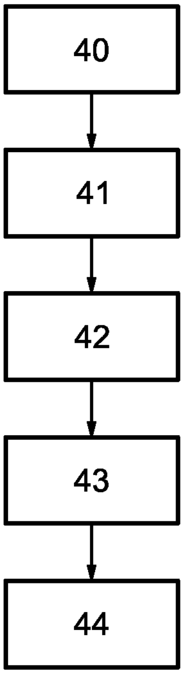
FIG. 3 illustrates an example of a method to determine a first predetermined relationship between a load and a fill rate of the horizontal grinding mill according to the invention.

The determination of the first relationship REL1 is explained as follows. FIG. 3 illustrates an example of a method for determining the first predetermined relationship REL1 during a training or calibration period. It is assumed that the second predetermined relationship REL2 is stored in the second memory 33. During a step 40, the drum 3 is filed with a known quantity of material. During a step 41, the motor 7 drives the filled drum 3. During step 42, the motor 7 is stopped and the fill rate of the drum 3 is measured.

Further, the load applied on the first bearing device 5 and the load applied on the second bearing device 6 are each determined by the determining means 27.

The first optical interrogator 29 measures the deformations of the outer ring 12 of the first bearing 8 from the first array of optical strain gauges (not shown) and the second optical interrogator 30 measure the deformations of the outer ring 13 of the second bearing 6 from the second array of optical strain gauges 23, 24, 25, 26.

The second determining means 32 determine a measured load acting on the first bearing 8 from the deformations of the outer ring 12 of the first bearing 8 measured by the first interrogator 29 and the second predetermined relations ship REL2. Further, the second determining means 32 determine a measured load acting on the second bearing 9 from the deformations of the outer ring 13 of the second bearing 9 measured by the second interrogator 30 and the second predetermined relationship REL2.

During step 43, the measured loads acting on the first and second bearings 8, 9 and the measured fill rate of the drum 3 are stored in a memory (not represented).

Steps 40, 41, 42, 43 are repeated a plurality of times with different known quantities of material. When steps 40, 41, 42, 43 are repeated the plurality of times, during a step 44, the first predetermined relationship REL1 is determined from each data couple including the measured fill rate of the drum 3 and the associated measured loads acting on the bearings 8, 9 implementing, for example, a regression model.

In another embodiment, the first predetermined relationship REL1 is determined by simulations, calculation or theoretical relations during the training/calibration period.

Figure 4:
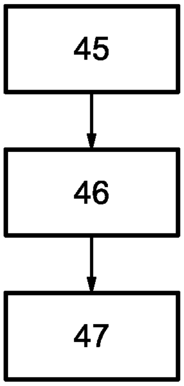
FIG. 4 illustrates an example of a method to determine the fill rate of the horizontal grinding mill according to the invention.

FIG. 4 illustrates an example of a method for determining the fill rate of the drum 3 during normal operation of the drum 3, i.e., during typical commercial production operation of the horizontal grinding mill 1. It is assumed that the first predetermined relationship REL1 is stored in the first memory 28 and the second predetermined relationship REL2 is stored in the second memory 33.

During a step 45, the motor 7 drives the filled drum 3. During a step 46, while the motor 7 drives the drum 3, the drum 3 is continuously fed in one end with the material to be ground, and from the other end, the ground material is discharged.

The first optical interrogator 29 measures the deformations of the outer ring 12 of the first bearing 8 from the first array of optical strain gauges (not depicted) and the second optical interrogator 30 measures the deformations of the outer ring 13 of the second bearing 9 from the second array of optical strain gauges 23, 24, 25, 26.

The second determining means 32 determine the load acting on the first bearing 8 and the load acting on the second bearing 9. The fill rate determining means 28 determine the fill rate of the drum 3 in real time from the first predetermined relationship REL1, the determined load applied on the first bearing device 5 and the determined load applied on the second bearing device 6 determined by the second determining means 32. The fill rate of the drum 3 is continuously determined or calculated.

In another embodiment, the fill rate of the drum 3 is determined from the load applied on one of the first and second bearing devices 5, 6, the first predetermined relationship REL1 being between the fill rate of the drum 3 and the load applied on the one of the first and second bearing devices 5. 6.

The monitoring device 20 permits accurate estimation of the fill rate of the drum 3 in real time without analyzing the power generated by the motor 7, allowing for a more accurate estimation of the fill rate inside the drum 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A method for determining the fill rate of drum of a horizontal grinding mill, the grinding mill including a drum and first and second bearing devices rotationally supporting the drum, the method comprising the steps of:

determining a load applied on the first bearing device during operation of the horizontal grinding mill; and determining the fill rate of the drum during operation of the horizontal grinding mill from a first relationship determined during a calibration period, the first relationship correlating the fill rate of the drum to the determined load applied on the first bearing device.

2. The method according to claim 1, further comprising a step of determining a load applied on the second bearing device, the first relationship correlating the fill rate of the drum to the determined load applied on the first bearing device and to the determined load applied on the second bearing device.

3. The method according to claim 1, further comprising a step of determining the first relationship during the calibration period, the determination of the first relationship comprising:

a) filling the drum with a known quantity of a material;

b) rotating the filled drum;

c) stopping the filled drum;

d) measuring the fill rate of the drum and the load applied on each bearing device;

e) repeating the steps a) to d) a plurality of times for different quantities of the material; and f) after repeating the steps a) to d) a plurality of times, determining the first relationship between the measured fill rates of the drum and the measured loads applied on each bearing device.

4. The method according to claim 1, wherein:

each bearing device includes a bearing, each bearing having an inner ring and an outer ring capable of rotating concentrically relative to one another, and a fiber optic sensor including an array of optical strain gauges mounted on either the inner ring or the outer ring of the bearing;

the step of determining the load applied on each bearing device include the substeps of:

measuring the deformations of the inner or outer ring of each bearing from the array of optical strain gauges; and determining the load acting on each bearing from the deformations of the inner ring or the outer ring of the bearing and a predetermined second relationship between the deformations and the load.

5. The method according to claim 1, wherein the first relationship is a regression model.

6. A bearing arrangement for a horizontal grinding mill, the grinding mill including a drum, the bearing arrangement comprising:

a first bearing device and a second bearing device, the drum being rotationally supported by the first and second bearing devices;

load determining means configured to determine a load applied on the first bearing device; and fill rate determining means configured to determine a fill rate of the drum during operation of the horizontal grinding mill from a first relationship determined during a calibration period, the first relationship correlating the fill rate of the drum to the determined load applied on the first bearing device.

7. The bearing arrangement according to claim 6, wherein the load determining means are further configured to determine the load applied on the second bearing device and the first relationship correlates the fill rate of the drum to the determined load applied on the first bearing device and to the determined load applied on the second bearing device.

8. The bearing arrangement according to claim 6, wherein the first relationship is a regression model.

9. The bearing arrangement according to claim 6, wherein:

each bearing device includes a bearing having an inner ring and an outer ring, at least one of the inner and outer rings being capable of rotating concentrically relative to the other one of the inner and outer rings, and a fiber optic sensor including an array of optical strain gauges mounted on the inner ring or on the outer ring of the bearing; and the load determining means includes measuring means configured to measure the deformations of the inner ring or the outer ring of each bearing from the array of optical strain gauges and a second determining means configured to determine the load acting on each bearing from deformations of the inner ring or the outer ring of the bearing and a predetermined second relationship between the deformations and the load.

10. The bearing arrangement according to claim 9, wherein the measuring means include an optical interrogator connected to at least one fiber optic sensor.

11. A bearing arrangement for a horizontal grinding mill, the grinding mill including a drum, the bearing arrangement comprising:

a first bearing device and a second bearing device, the drum being rotationally supported by the first and second bearing devices;

a load determiner configured to determine a load applied on the first bearing device; and a fill rate determiner configured to determine a fill rate of the drum during operation of the horizontal grinding mill from a first relationship determined during a calibration period, the first relationship correlating the fill rate of the drum to the determined load applied on the first bearing device.

12. The bearing arrangement according to claim 11, wherein the load determiner is further configured to determine the load applied on the second bearing device and the first relationship correlates the fill rate of the drum to the determined load applied on the first bearing device and to the determined load applied on the second bearing device.

13. The bearing arrangement according to claim 11, wherein the first relationship is a regression model.

14. The bearing arrangement according to claim 11, wherein:

each bearing device includes a bearing having an inner ring and an outer ring, at least one of the inner and outer rings being capable of rotating concentrically relative to the other one of the inner and outer rings, and a fiber optic sensor including an array of optical strain gauges mounted on the inner ring or on the outer ring of the bearing; and the load determiner includes a measuring device configured to measure the deformations of the inner ring or the outer ring of each bearing from the array of optical strain gauges and a second load determiner configured to determine the load acting on each bearing from deformations of the inner ring or the outer ring of the bearing and a predetermined second relationship between the deformations and the load.

15. The bearing arrangement according to claim 14, wherein the measuring device includes an optical interrogator connected to at least one fiber optic sensor.

* * * * *